Patented July 7, 1931

1,813,497

UNITED STATES PATENT OFFICE

PAUL KOPPE, OF GOEHLITZ, AND GUENTHER ROBBEL, OF NEUROESSEN, GERMANY, ASSIGNORS TO I. G. FARBENINDUSTRIE AKTIENGESELLSCHAFT, OF FRANKFORT-ON-THE-MAIN, GERMANY

PRODUCTION OF PURE SULPHUR

No Drawing. Application filed March 13, 1930, Serial No. 435,645, and in Germany March 26, 1929.

The present invention relates to the production of pure sulphur.

A process for continuously obtaining sulphur from ammonium polysulphide solutions has already been suggested, in which the said solutions are added in a closed vessel to a liquid which is kept under ordinary or increased pressure at a temperature lying above the melting point of sulphur. A modification of this process has also been suggested, which consists in treating the ammonium polysulphide solution in a distilling column with direct steam on the counterflow principle and maintaining such a pressure above that of the atmosphere in the apparatus that the sulphur separates out at temperatures which lie above its melting point.

The sulphur resulting from these processes, though very pure in comparison with the ordinary sulphur of commerce in lump form of American or sicilian origin, yet frequently possesses in the solid form a greenish colour notwithstanding careful filtration of the polysulphide solution to be decomposed.

We have now found that sulphur can be obtained in a very pure state free from discolouration by the process hereinbefore described if the separation of the sulphur from the ammonium polysulphide solution be carried out in the presence of adsorbent substances. The impurities are adsorbed by these substances during the decomposition of the polysulphide and removed with them from the vessel in which the decomposition takes place.

The substances which may be employed for this purpose are very numerous. For example aluminium hydroxide and silicic acid gel or other voluminous, more or less slimy precipitates, such as magnesium hydroxide, zinc hydroxide or zinc sulphide may be mentioned. It is obvious that only such substances should be used which are themselves colourless and which do not in their turn cause even in slight traces any discolouration of the sulphur as would be the case with compounds of metals which form black coloured sulphide compounds. Precipitates of the kind referred to, generally hydrates in gel form, can be easily produced by the addition of the corresponding metallic salt solution to the polysulphide solution, as the latter contains under practical working conditions a certain amount of free ammonia. If however loss of ammonia by the formation of non-volatile ammonium salts is to be avoided, the precipitates may conveniently be produced separately from the polysulphide solution and the hydrate, previously precipitated separately, say by caustic soda or sodium carbonate for example, may be brought in aqueous suspension together with the polysulphide solution to be decomposed.

It is advantageous to use commercial water glass or the very active silicic acid gel produced therefrom. It is easy to produce a gel of high activity, that is to say one with a high coefficient of adsorption for the impurities in the polysulphide solution, without any necessity to provide for a complicated washing, drying, moulding or the like of the silicic acid jelly.

Instead of the voluminous precipitates above mentioned which are capable of enveloping the impurities and carrying them down with them and thereby keeping them away from the sulphur formed, other substances may also be used, which possess, particularly when in a finely pulverized state, a high coefficient of adsorption, for example, kaolin, bleaching powder, finely ground dry silicic acid gel (silica gel), kieselguhr, brown coal ash or the like.

Raw cellulose fibre also, for example, paper pulp, which is formed when wood is opened up by the sulphite process, can very well be used. It is not necessary to use a specially prepared (bleached) and consequently expensive cellulose, as is the case in the use of cellulose for clearing liquids, for example, in the manufacture of beer, but the cellulose may be used in a well washed state, as it is employed in the manufacture of paper, without further treatment.

If the production of sulphur be carried out in the known manner above referred to, in which the ammonium polysulphide solution is led into a closed boiling vessel in the same ratio as water and the vapours of ammonium sulphide are carried off therefrom, the ammonium polysulphide solution may be conveniently mixed with the substance which effects the purification and the addition of the solution interrupted from time to time. The heating of the contents of the boiler is then continued until the last traces of ammonium sulphide have been evaporated and expelled from the boiler. A portion of the contents of the boiler is then run off and a corresponding portion of the added purifying agent is thereby removed together with the impurities adsorbed thereby, any other impurities, such as fixed ammonium salts and the like which may be contained in the liquid being simultaneously removed. The complete separation of the purifying agent from the molten sulphur takes place very easily, as the highly voluminous substances, such as aluminium hydroxide, silicic acid gel and the like, remain directly in suspension owing to their low specific gravity, while the heavier sulphur sinks to the bottom in a pure state. Even however in the case of adsorption substances which are not voluminous, such for example as kaolin, bleaching powder and the like, complete separation from the sulphur produced takes place, if the substances be used in a finely powdered state. They remain in suspension in the residual aqueous solution and can be carried off continuously and directly with water.

In that method of carrying out the process in which the polysulphide solution is treated in a distilling column with direct steam on the counterflow principle, the process may be carried out with advantage by passing the purifying agent suspended in the polysulphide solution with it down through the trickling column. The agent also remains suspended in the aqueous residual solution at the bottom of the column and in the vessel in which the sulphur collects and is removed continuously from this latter with the water. A surprising fact is that no deposition of the solid particles contained in the liquid takes place on or between the bodies with which the column is filled, neither is there any choking up of the filling material. This seems to be due to a specific action of the sulphur which is separated in form of small drops and which, on its way through the filling material prevents any of the suspended parts from lodging between the filling bodies. No deleterious deposition on or between the filling takes place either when cellulose fibres are used as the purifying material.

The sulphur produced by the present process is of a very fine pure yellow colour. It possesses therefore a high selling value, which is equal to that of silician stick sulphur. The impurities which are still contained in it are so trifling that they cannot or can scarcely be detected by analysis.

The following examples will further illustrate the nature of this invention but the invention is not restricted to these examples.

Example 1

40 litres of sodium silicate solution of 38° Baumé strength are diluted with 160 litres of water; 40 litres of dilute hydrochloric acid (1:10) are added to the resulting sodium silicate solution at a temperature of about 50° centigrade while stirring. A silica gel suspension is obtained of which 40 litres are added to each 700 litres of an ammonium polysulphide solution containing about 250 grams of dissolved sulphur per litre. The resulting mixture is supplied to a decomposition column by means of a pump, the said column being filled with so called Raschig rings of porcelain. The solution is treated therein with a counter-current of steam under a pressure of 1.5 atmospheres. No clogging of the column or filling bodies occurs even when the plant is in operation for several weeks without interruption. A pure yellow sulphur is obtained.

Example 2

32 kilograms of aluminum sulphate are dissolved in 80 litres of water. 14 litres of this solution are added to each 700 litres of polysulphide solution of the kind referred to in Example 1. The decomposition of the polysulphides is effected in the same manner as described in the foregoing example. It takes place with a formation and in the presence of voluminous aluminum hydroxide. Pure yellow sulphur is obtained which has a still brighter colour than the sulphur obtained according to Example 1.

What we claim is:—

1. In the production of sulphur by decomposition of ammonium polysulphide solutions at temperatures above the melting point of sulphur, the step of effecting the decomposition in the presence of an adsorbent substance.

2. In the production of sulphur by decomposition of ammonium polysulphide solutions at temperatures above the melting point of sulphur, the step of effecting the decomposition in the presence of a colourless slimy precipitate having adsorbent properties.

3. In the production of sulphur by decomposition of ammonium polysulphide solutions at temperatures above the melting point of sulphur, the step of effecting the decomposition in the presence of slimy aluminum hydroxide.

In testimony whereof we have hereunto set our hands.

PAUL KOPPE.
GUENTHER ROBBEL.